Feb. 16, 1954     P. C. NEILSEN     2,669,014
RASP LOADING FIXTURE
Filed June 15, 1950     2 Sheets-Sheet 1

Inventor:
Peter C. Neilsen
By Zabel & Gritzbaugh
Attorneys

Feb. 16, 1954 P. C. NEILSEN 2,669,014
RASP LOADING FIXTURE
Filed June 15, 1950 2 Sheets-Sheet 2
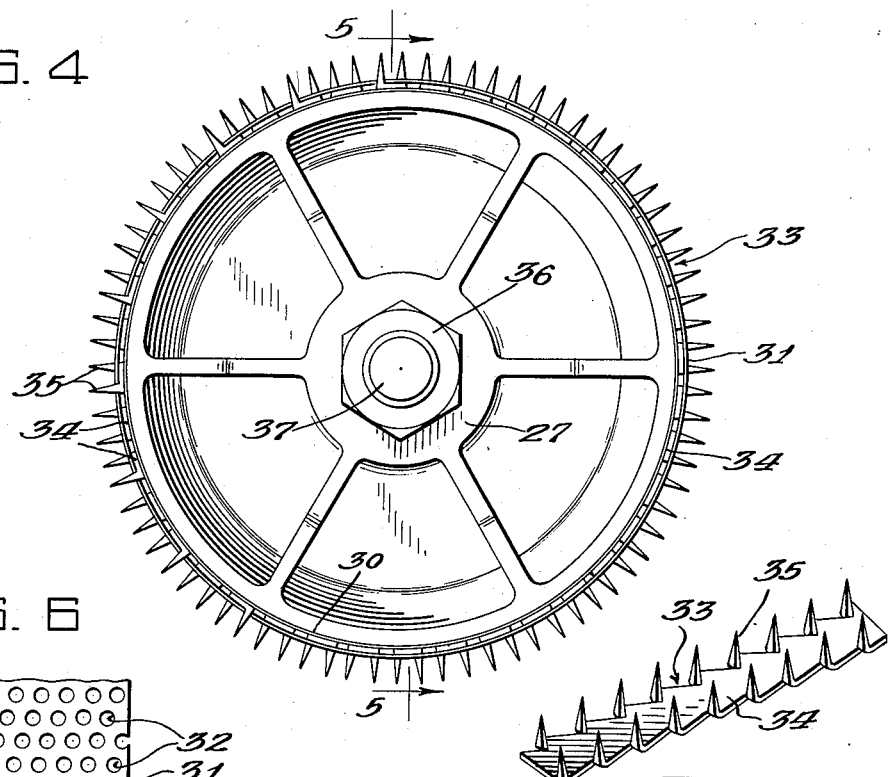
FIG. 4
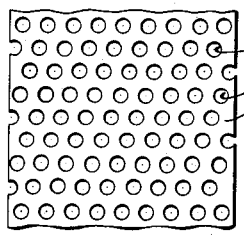
FIG. 6
FIG. 7
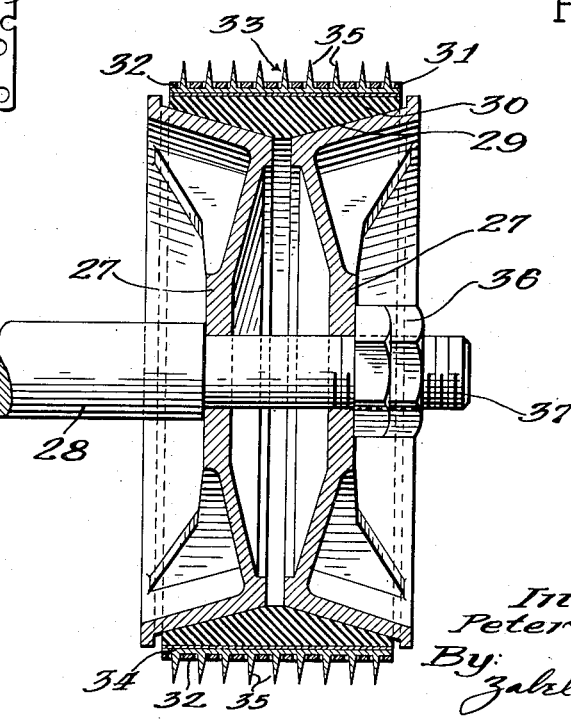
FIG. 5
Inventor:
Peter C. Neilsen
By: Zabel & Dritzbaugh
Attorneys Patented Feb. 16, 1954

2,669,014

UNITED STATES PATENT OFFICE 2,669,014

RASP LOADING FIXTURE

Peter C. Neilsen, Lake Elmo, Minn.

Application June 15, 1950, Serial No. 168,303

2 Claims. (Cl. 29—284)

1

The present invention relates to a loading device for use in connection with assembling a rasp unit. In particular the present invention is intended for use in connection with assembling tire rasps that are equipped with toothed elements that are provided with teeth extending in a substantially radial direction outwardly on the peripheral face or surface of a drum. The drum is intended to be mounted on a shaft for rotation and tires to be retreaded are brought into engagement with the rotating teeth for preparing the tread surface of the tire.

The principal purpose of the present invention is to provide a fixture that can be rigidly mounted on a bench or working surface. This fixture is adapted to receive first of all, a perforated band into which are inserted the toothed elements. Not only is the perforated band held in proper location by the present fixture but as the toothed elements are inserted in place in the band, the fixture also serves to hold the toothed elements in place temporarily while the loading operation is being performed. At the completion of the loading operation means are provided for holding all of the toothed elements in place while an inner holding band is inserted and brought into engagement with all of the toothed elements so as to permanently hold these elements in place. The thus assembled bands are then removed from the fixture and the remaining parts of the complete rasp assembly are inserted into this initial assembly.

The present loading fixture is not only very effective in accomplishing the desired results but it is simple both in its construction and in its operation and it permits the loading operation to be completed rapidly.

The foregoing constitute some of the principal objects and advantages of the present invention, others of which will become apparent from the following description and the drawings, in which:

Fig. 4 is a front elevational view of a completely assembled tire rasp of the type employed on the loading fixture illustrated in Fig. 1;

Fig. 5 is a vertical sectional view taken through the tire rasp, the view being taken along the line 5—5 of Fig. 4;

Fig. 6 is a fragmentary plan view of the aper-

2 tured or perforated band through which the toothed elements project; and

Fig. 7 is an enlarged perspective view of one of the toothed elements that is loaded into the perforated band shown in Fig. 6.

For the purpose of illustrating the present invention a single embodiment has been selected, though it is recognized that modifications may be made without departing from the intended scope of the invention.

Figure 1:
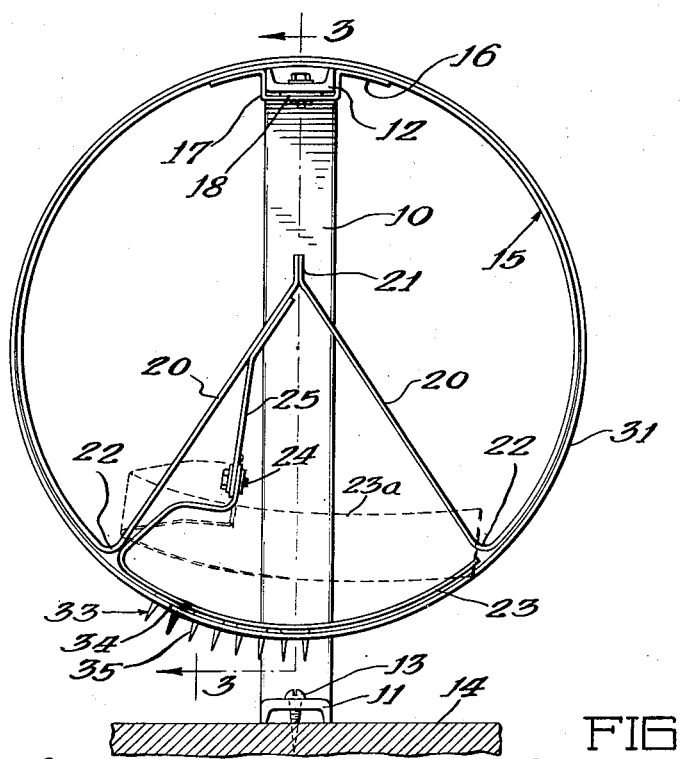
Fig. 1 is a front elevational view of a loading fixture embodying the present invention.
Figure 2:
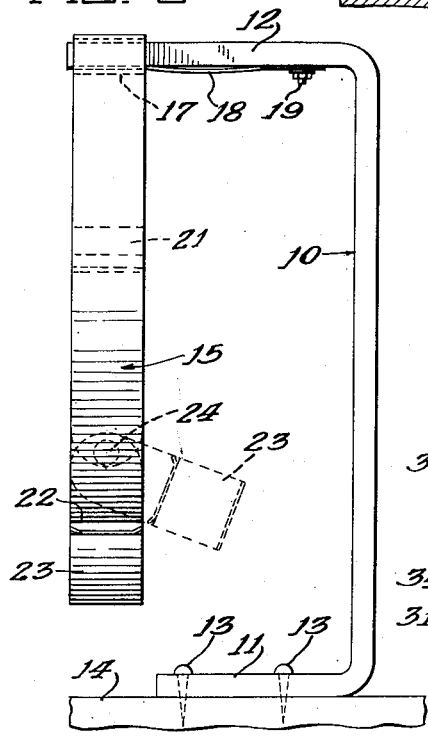
Fig. 2 is a side elevational view of the fixture shown in Fig. 1.
Figure 3:
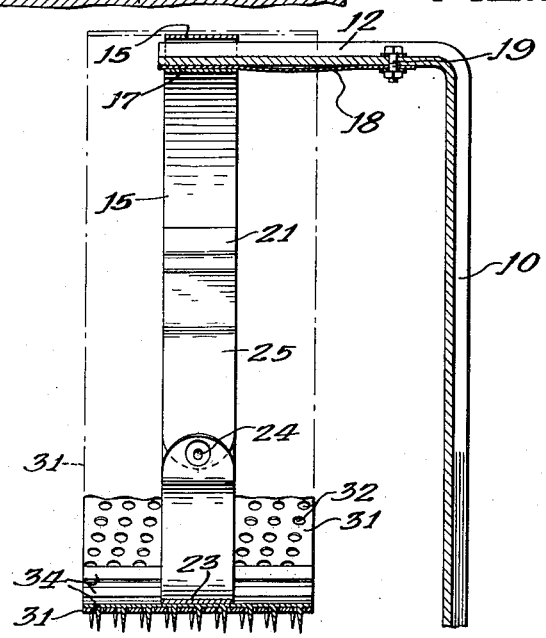
Fig. 3 is a vertical sectional view through the loading fixture, the view being taken along the line 3—3 of Fig. 1.

Referring to Figs. 1 to 3 inclusive, the invention comprises generally an upstanding bracket or frame 10 that is provided with a flange or foot portion 11 at its lower end and an outwardly projecting flange or bracket 12 at its upper end. The frame 10 is initially firmly secured by means of screws 13 or the like onto the bench or working surface indicated at 14 in Fig. 1.

Mounted on this frame 10 is a split band member generally indicated at 15 that is provided at its upper end with a socket member 16 that provides a channel-shaped socket portion 17 that is adapted to pass over the flange 12 at the upper end of the frame 10. As best shown in Fig. 3 a locking spring member 18 is bolted as at 19 to the flange 12 of the frame 10 against the underneath face thereof. This spring 18 provides a wedge fit between the socket portion 17 and the flange 12 of the frame.

The split band 15 is provided with inwardly extending arms 20 that meet and are fastened together at 21. The band 15 is arcuate in shape, terminating at spaced edges 22 and mounted between these spaced edges 22 is a gate member 23 that is pivotally secured by means of a bolt 24 to a bracket member 25 that is secured to one of the arms 20. This gate 23 is adapted to pivot from the solid line position shown in Fig. 1 where it closes the space between the spaced edges 22 and forms a continuation of the arcuate band to an open or broken line position 23a where the space between the edges 22 of the band 15 is left open.

In describing the use of the loading fixture shown in Figs. 1 to 3, reference first should be made to Figs. 4 to 7 inclusive where a tire rasp is shown. The loading fixture is used in assembling the various parts of this tire rasp.

Referring to Fig. 5, the rasp generally comprises a pair of hub members 27 that are apertured so as to be mountable on a shaft 28. Mounted about the peripheries of these hub members 27 is a resilient backing band 29, about which is circumferentially mounted a metal retaining band 30. Concentrically mounted about this retaining band 30 is a perforated metal band 31, which as best shown in Fig. 6 is provided with a larger number of perforations 32 over its entire surface. Disposed between the perforated band 31 and the retaining band 30 is a plurality of toothed elements generally indicated at 33. Each of these toothed elements 33 (see Fig. 7) takes the form of a plate-like member 34 that has spaced along its opposite edges a plurality of teeth 35, the latter of which are adapted to project through the apertures 32 in the perforated band 31 when the rasp is completely assembled. A nut 36 is threaded onto a threaded portion 37 of the shaft 28 and when tightened holds the rasp parts in their assembled positions.

The operation of the loading fixture can best be understood by again referring to Figs. 1 to 3 inclusive. The first step is to mount the perforated band 31 of the rasp concentrically over the split band 15 of the loading fixture. This is accomplished by first moving the gate 23 to its broken line position 23a shown in Fig. 1, and then by grasping the arms 20 and squeezing them toward each other to decrease the diameter of the split band 15 the perforated band 31 can readily be placed over the split band 15. While the gate 23 is still in its open position 23a the toothed elements 33 of the rasp are inserted in the perforated band 31 so that they are disposed in the manner shown in Fig. 1. As these toothed elements 33 are placed in the band the band 31 is rotated about the split band 15 until all of the required number of toothed elements 33 have been inserted. The gate 23 is then swung to its closed or solid line position shown in Fig. 1 and then the entire assembly including the split band 15 and the now loaded perforated band 31 is removed from the frame 10 and placed in a horizontal position on a bench. The split band 15 together with the closed gate 23 serve as backing or retaining members to hold the toothed elements 33 in place in the perforated band 31.

As shown in Fig. 3 the width of the split band 15 is less than the overall width of the perforated band 31 and initially the perforated band 31 is mounted so that this split band 15 occupies substantially the central region of the perforated band. While the assembly is lying horizontally on a bench the metal retaining band 30 is inserted and forced inside the perforated band 31 and against the inner faces of all the toothed elements 33. As the retaining band 30 is forced into place the entire assembly that includes this band, the perforated band 31 and the toothed elements 33 that are retained therebetween, is removed from the split band 15. The remaining elements of the complete rasp can be installed without further use of the loading fixture. These remaining elements include the resilient backing member 29 and the hub members 27.

Not only has the present loading fixture proven to be very efficient in its use but also the time required to complete the assembling steps has been greatly reduced over that formerly required when using other known loading fixtures.

The term "narrow width" used in the following claims is understood to mean that the width of split band 15 is substantially less than the width of a perforated rasp band 31 used with the split band. The difference in width between the two bands enables split band 15 to occupy a central position with respect to rasp band 31. After all toothed elements 33 have been loaded and gate 23 closed, retaining band 30 is forced part way into place through one side of rasp band 31. Thereafter gate 23 is opened, and the split band 15 is partially collapsed if necessary, after which the split band is removed from the other side of rasp band 31. Meanwhile all toothed elements 33 are retained properly in position.

I claim:

1. A rasp loading fixture comprising an upright support, a substantially angular narrow width split band having spaced apart end edges, means removably mounting the split band on the support with the spaced apart edges disposed downwardly, and a movable gate pivoted to one of said end edges and adapted to span the space to the other end edge, the gate being arcuate to conform to the curvature of the split band and being movable to an open position to free the space between the end edges.

2. A rasp loading fixture comprising an upright support, a substantially annular narrow width split band having spaced apart end edges, a movable gate pivoted to said band and adapted to span the space between the end edges, the gate being arcuate to conform to the curvature of the split band and being movable to an open position to free the space between the end edges, and means removably mounting the split band on the support with the spaced apart edges disposed downwardly, the mounting means engaging the band only at the diametrically opposite side from the spaced apart edges.

PETER C. NEILSEN.

References Cited in the file of this patent

UNITED STATES PATENTS

| Number | Name | Date |
|---|---|---|
| 410,426 | Metcalf | Sept. 3, 1889 |
| 619,692 | Perry | Feb. 14, 1899 |
| 1,000,261 | Hansen | Aug. 8, 1911 |
| 1,573,183 | Mehlum | Feb. 16, 1926 |
| 2,358,110 | Simon | Sept. 12, 1944 |
| 2,348,288 | Fontaine | May 9, 1944 |
| 2,560,735 | Neilsen | July 17, 1951 |

FOREIGN PATENTS

| Number | Country | Date |
|---|---|---|
| 21,510 | Great Britain | Oct. 7, 1903 |